(12) United States Patent
Fredrickson (10) Patent No.: US 8,205,763 B2
(45) Date of Patent: Jun. 26, 2012

(54) REUSABLE CONTAINER

(75) Inventor: Eric Victor Fredrickson, Lancaster, MA (US)

(73) Assignee: Rentacrate LLC, Waltham, MA (US)

( * ) Notice: Subject to any disclaimer, the term of this patent is extended or adjusted under 35 U.S.C. 154(b) by 193 days.

(21) Appl. No.: 12/150,992

(22) Filed: May 2, 2008

(65) Prior Publication Data

US 2009/0272739 A1 Nov. 5, 2009

(51) Int. Cl.
 *B65D 6/00* (2006.01)
 *B65D 8/14* (2006.01)
(52) U.S. Cl. .............. 220/4.28; 220/6; 220/531
(58) Field of Classification Search .......... 220/4.28, 220/4.32, 6, 7, 826, 531
 See application file for complete search history.

(56) References Cited

U.S. PATENT DOCUMENTS

| | | | |
|---|---|---|---|
| 3,635,638 A | 1/1972 | Bryan | |
| 4,081,099 A | 3/1978 | Shead | |
| 4,161,261 A | 7/1979 | Frater | |
| 4,775,069 A * | 10/1988 | Stonier | 220/6 |
| 4,781,300 A | 11/1988 | Long | |
| 4,901,867 A * | 2/1990 | Petty, Jr. | 211/46 |
| 4,913,302 A | 4/1990 | Stonier | |
| 5,199,592 A | 4/1993 | Reiland et al. | |
| 5,673,791 A | 10/1997 | Jameson | |
| 5,865,334 A | 2/1999 | Ruiz et al. | |
| 5,992,673 A | 11/1999 | Hwang | |
| 6,000,576 A | 12/1999 | Liu | |
| 6,036,049 A | 3/2000 | Hwang | |
| 6,056,177 A * | 5/2000 | Schneider | 224/401 |
| 6,202,884 B1 * | 3/2001 | Verkerke | 220/530 |
| 6,253,943 B1 * | 7/2001 | Spykerman et al. | 220/6 |
| 6,276,530 B1 | 8/2001 | Bailey | |
| 6,338,181 B1 | 1/2002 | Hwang | |
| 6,460,717 B1 | 10/2002 | Smyers et al. | |
| 6,905,015 B2 * | 6/2005 | Hernandez et al. | 206/45.24 |
| 6,918,508 B2 | 7/2005 | Hwang | |
| 7,048,135 B2 | 5/2006 | Smyers et al. | |
| 2004/0262307 A1 * | 12/2004 | DeCarlo et al. | 220/6 |
| 2006/0231555 A1 * | 10/2006 | Smyers et al. | 220/6 |

OTHER PUBLICATIONS

IPL, SmartCrate Reusable Plastic Containers, US Updated brochure.
IPL, FlapNest Attached Lid Nestable Containers, US Updated brochure.

* cited by examiner

*Primary Examiner* — Harry Grosso
(74) *Attorney, Agent, or Firm* — Jones Day (57) ABSTRACT

A reusable container has four vertical side walls affixed to a rectangular base that can be moved between an extended position and a folded position. When the vertical side walls are in the extended position, the vertical side walls form a rectangular enclosure about a rectangular base. The rectangular enclosure can be divided into two sections by one or more movable members positioned within the rectangular enclosure for transporting different-sized documents, papers, or files. The vertical side walls may be moved into a folded position when the reusable container is empty to reduce the space required for transporting the empty containers. The reusable container interlocks with other reusable containers stacked on a dolly in either the extended position or the folded position such that stacks of reusable containers can be pushed on a dolly up inclines and over bumps without any restraints.

30 Claims, 7 Drawing Sheets

REUSABLE CONTAINER

BACKGROUND

The present disclosure generally relates to a reusable container and, more particularly, to a reusable, foldable crate for moving or storing documents, papers, or files.

Conventional boxes for shipping or storing documents, papers, or files are constructed from disposable materials such as cardboard or paper. The disposable boxes are typically thrown out at the final destination for moving or office relocation, and therefore, the disposable boxes do not require transportation back to the shipping facility. The disposal of the disposable containers at the final destination requires the shipping company to produce new boxes for the next move. The production and subsequent disposal of the disposable boxes is a waste of material resources. Additionally, although the insubstantial materials from which the disposable boxes are constructed allow for ease of disposal, they also allow the disposable containers and their contents to be easily damaged by adverse environmental conditions such rain or snow, or through rough handling. To solve the waste and durability problems associated with disposable boxes, the prior art proposed using durable crates constructed from plastics or metals for transporting and storing documents, papers, or files.

The durable crates provide better protection for their contents during shipping or storing. The durable crates can be reused for subsequent moves or office relocations. Therefore, the durable crates reduce the problems of durability and the waste of material resources associated with the disposable boxes. However, the use of the durable crates to transport documents, papers, or files wastes shipping resources, because the durable crates require shipping from the final destination of the move or the office relocation back to the shipping facility so that the durable crates can be sorted and reused. The durable crates occupy the same amount of shipping space or storage space regardless of whether the durable crates are full or empty. Thus, shipping and storage resources are wasted because of the amount of space consumed to ship the empty durable crates from the final destination of the move or office relocation back to the shipping facility and the amount of space consumed to store the empty durable containers.

To solve the shipping and storing space problems associated with durable crates, the prior art proposed using either collapsible or nestable durable crates constructed from plastics or metals for transporting and storing goods. The collapsible durable crates of the prior art can be flattened when empty to reduce the shipping and storage space consumed by empty crates. Although the collapsible durable crates reduce the shipping and storage space problem associated with the durable crates, current designs are complex. With respect to the nestable crates, the degree to which crates can nest within one another is dependent upon a number of factors such as the degree of taper. However, the greater the taper, the more wasted space, particularly when rectangular objects like files and binders are carried by the nestable crates. Nestable crates also require the use of more material in their construction because the walls are not vertical and must be made thicker to obtain the same strength as a vertical wall.

The disposable boxes, the durable crates, and the collapsible/nestable durable crates are dedicated for shipping and storing only one size of document, file, or paper. These prior art containers fail to efficiently utilize the volume of space provided by the containers when shipping and storing other sizes of documents, papers, or files. When shipping and storing documents, papers, or files for which the crate was not sized, the prior art containers can damage and jumble the documents, papers, or files. In some instances, the prior art containers simply cannot accommodate other sizes of documents, papers, or files within the containers. The prior art containers further waste shipping and storage resources when documents, papers, or files of various sizes are shipped or stored because the volume of space provided by the containers is not efficiently utilized. This increases the number of prior art containers that must be shipped to the final destination and the number of empty containers that must be shipped back from the final destination. Thus, a need exists for a container that addresses the problems inherent in the prior art.

SUMMARY

In one embodiment, the present disclosure contemplates a reusable container for use in moving and storing documents, papers, or files. The container has a rectangular base and a first pair of vertical side walls affixed to the rectangular base. Each of the first pair of vertical side walls has a file rail. The container has a second pair of vertical side walls affixed to the rectangular base so as to form a rectangular enclosure with the first pair of vertical side walls. Each of the second pair of vertical side walls also has a file rail. A movable member is affixed so as to move between a first position and a second position in which the movable member divides the rectangular enclosure. In one embodiment, when the movable member is in the first position and the rectangular enclosure is not divided, the rectangular enclosure is sized to accommodate one row of legal-sized files. When the movable member is in the second position, the rectangular enclosure is divided so as to accommodate a smaller row of legal-sized files and one row of letter-sized files, or no legal-sized files and two rows of letter-sized files. The movable member may be a single member carrying two file rails. Alternatively, the function of the moveable member may be provided by two movable members, each carrying a file rail.

In an additional embodiment, the present disclosure contemplates a plurality of reusable containers, each having a rectangular base having a raised edge along the perimeter of the base and extending upwardly. A first pair of vertical side walls is affixed to the rectangular base, wherein each of the first pair of vertical side walls has a file rail and is configured to fold and be stored within the edge of the rectangular base. A second pair of vertical side walls is affixed to the rectangular base so as to form a rectangular enclosure with the first pair of vertical side walls, wherein each of the second pair of vertical side walls has a file rail and is configured to fold and be stored within the edge of the rectangular base. A movable member is affixed so as to move between a first position and a second position in which the movable member divides the rectangular enclosure. In this embodiment, the containers may have one or more movable members as discussed above.

In another embodiment, the disclosed reusable containers, either in the extended or collapsed position, may be stacked, one on top of another. The stack may be used in combination with a dolly having a rectangular surface configured for receiving the plurality of reusable containers. A plurality of casters is affixed to the opposite side of the rectangular surface.

The collapsible, reusable container of the present disclosure provides a secure container that can be sized on the job to accommodate files of various sizes so that the containers can be efficiently used. These, and other advantages and benefits, will be apparent from the following description.

BRIEF DESCRIPTION OF THE DRAWINGS

For the present disclosure to be easily understood and readily practiced, the present disclosure will now be described for purposes of illustration and not limitation, in connection with the following figures, wherein:

FIG. 4 illustrates the reusable container of FIG. 1 with a pair of vertical side walls in an extended position and a pair of vertical side walls being rotated into a folded position while

DETAILED DESCRIPTION

Reference will now be made in detail to certain embodiments of the present disclosure, examples of which are illustrated in the accompanying drawings. It is to be understood that the figures and descriptions of the present disclosure included herein illustrate and describe elements that are of particular relevance to the present disclosure, while eliminating others, for the sake of clarity. It is noted at the outset that the term "affixed" generally refers to an attachment in any manner appropriate for the materials of construction known by one of ordinary skill in the art.

Figure 1:
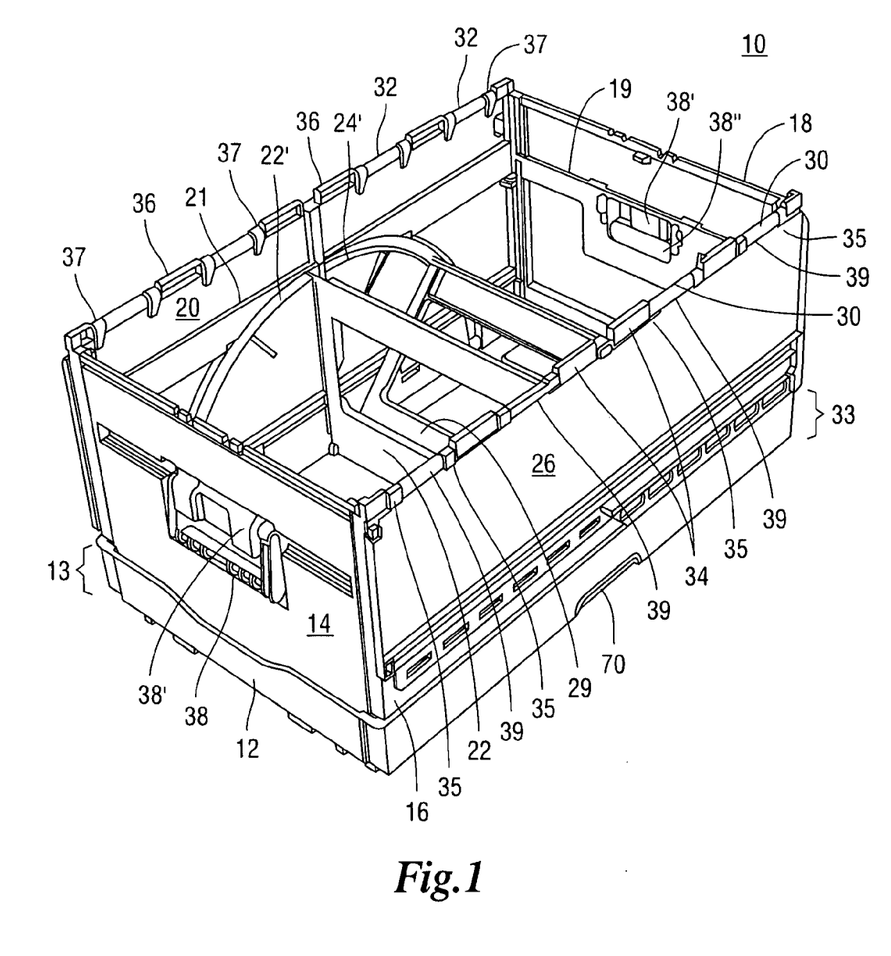
FIG. 1 illustrates a reusable container with four vertical side walls in an extended position, a first movable member in a first position, and a second movable member in transition from a first position to a second position in accordance with the teachings of the present disclosure.

A reusable container 10 constructed according to the teachings of the present disclosure is illustrated in FIG. 1. The container 10 is comprised of a rectangular base 12. The rectangular base 12 has a raised edge 13 along its perimeter. A first pair of short vertical side walls 14, 18 and a second pair of long vertical side walls 16, 20 are affixed the rectangular base 12 of the reusable container 10. The first 14, 18 and second 16, 20 pairs of vertical side walls are shown in an extended position so as to form a rectangular enclosure about the rectangular base 12. Each of the first 14, 18 and second 16, 20 pairs of vertical side walls has a file rail affixed thereto. The file rails are configured for receiving hanging files. FIG. 1 illustrates a file rail 19 molded into the vertical side wall 18 and a file rail 21 molded into the vertical side wall 20. The file rails molded into the vertical side walls 14 and 16 are not visible in the view of the container 10 illustrated in FIG. 1. Although file rails 19 and 21 are shown in FIG. 1 as being molded into the vertical side wall 18 and the vertical side wall 20, respectively, the file rails molded into the vertical side walls 12, 14, 16, 18 can be affixed by any manner known by one of ordinary skill in the art appropriate for the material of which the side walls are constructed. The container 10 is sized, according to a preferred embodiment, such that the distance between the second pair of vertical side walls 16, 20 is sufficient for legal-sized files 40 (See FIG. 2A) to be hung using file rail 21 and the complimentary file rail (not shown) of vertical side wall 16. In one embodiment, the long side walls 16, 20 may be approximately thirty inches (76.2 cm) long to accommodate an entire drawer of legal-sized files extending in a first dimension and approximately fifteen inches (38.1 cm) wide to accommodate an entire drawer of letter-sized files in two rows extending in a second dimension perpendicular to the first dimension.

The reusable container 10 in FIG. 1 illustrates first and second movable members 22, 24, respectively, for dividing the rectangular enclosure formed about the rectangular base 12. The first and second movable members 22, 24 are movable between a first position for enabling the reusable container to accommodate a full row of legal-sized files and a second position for enabling the reusable container to accommodate either one-half of a row of legal-sized files 40 and one row of letter-sized files 42 as shown in FIG. 2A or two rows 42, 42a of letter-sized files and no rows of legal-sized files as shown in FIG. 2B.

The reusable container 10 of FIG. 1 shows the first movable member 22 in the second position and the second movable member 24 being moved between the first position and the second position. The first and second movable members 22, 24, respectively, are affixed by any manner known by one of ordinary skill in the art that permit the first and second movable members to move between the first and second positions. Additionally, the first and second movable members can be affixed to any part of the reusable container. By affixing the first 22 and second 24 movable members, for example, to a pivot point at or near the bottom of the reusable container 10, the rectangular volume of the reusable crate 10 can be easily sized on the job without fear of components being lost. Additionally, by affixing the first and second members 22, 24 to the bottom of the container 10, the first and second members 22, 24 may travel in optional raceways 22', 24' respectively, formed in long wall 20 and a complimentary set of raceways formed in long wall 16, not visible in the view shown in FIG. 1. Reusable crates 10 of various sizes and with one or more movable members can be constructed to provide a variety of ways in which the rectangular volume of the reusable crates 10 may be partitioned and used.

Figure 2A:
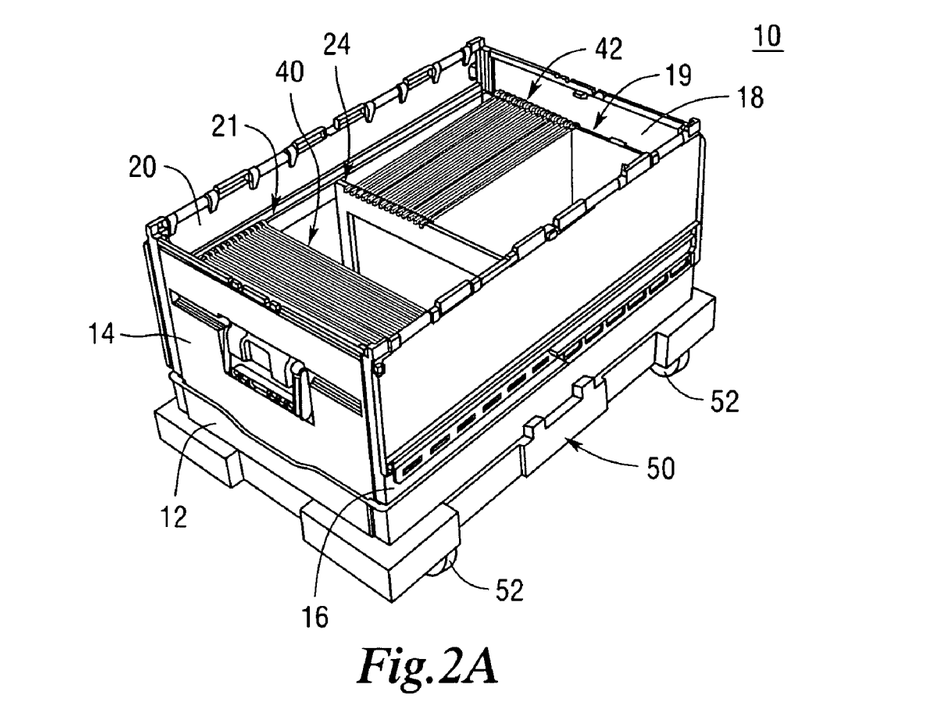
FIG. 2A illustrates the reusable container of FIG. 1 used to store a shortened row of legal-sized files and one row of letter-sized files.
Figure 2B:
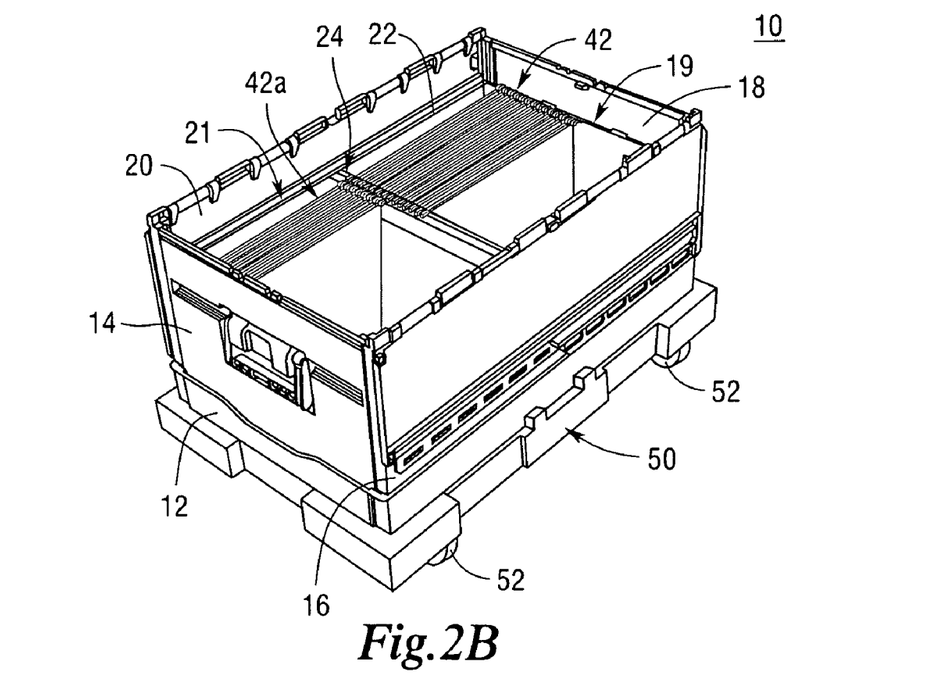
FIG. 2B illustrates the container storing two rows of letter-sized files.

As shown in FIG. 2A, when the second movable member 24 is in the second position, letter-sized files 42 can be hung using the file rail 19 on vertical side wall 18 and member 24. When, as shown in FIG. 2B, first movable member 22 is also in the second position, letter-sized files 42a can be hung using the file rail on vertical side wall 14 and member 22. In another embodiment of the present invention, the reusable container may have a single movable member movable between the first position and second position. Such a single movable member would either have a top configured to receive and support letter-sized files on both sides thereof, or carry appropriate file rails for supporting letter-sized files on each side thereof.

Figure 3:
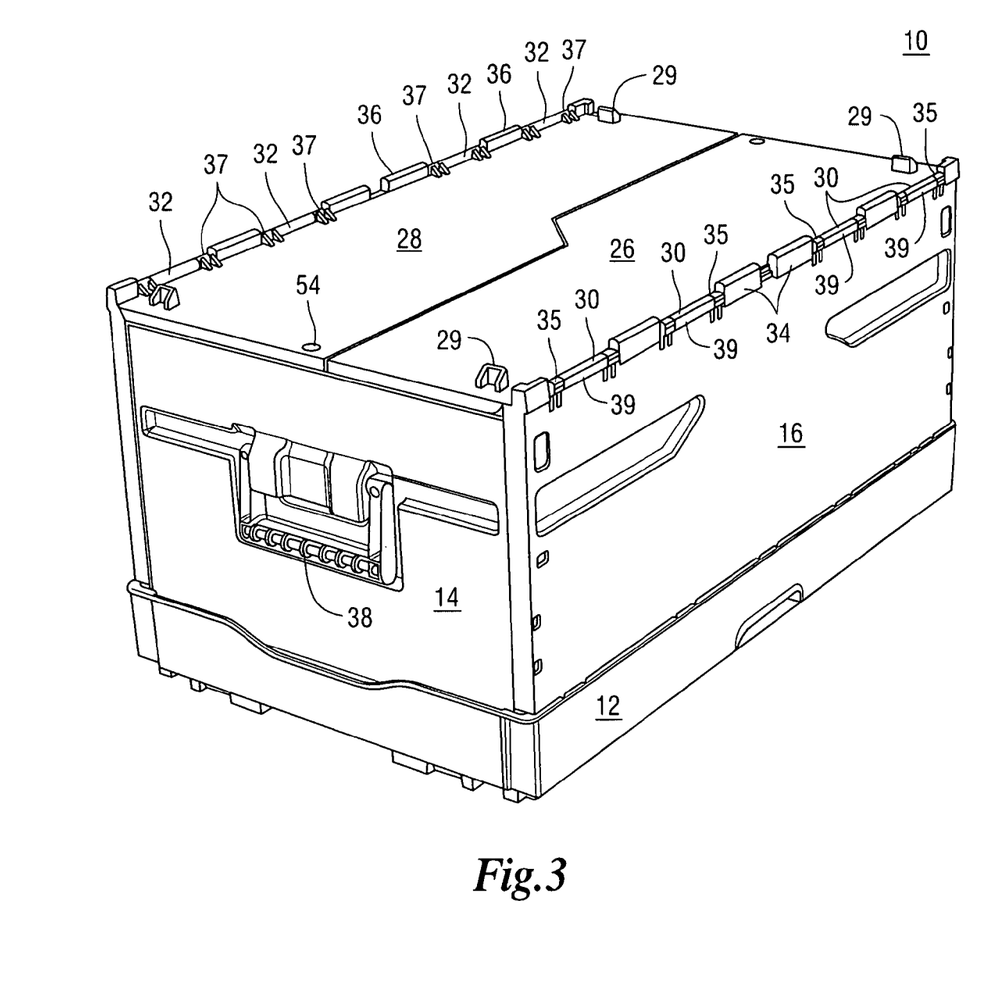
FIG. 3 illustrates the reusable container of FIG. 1 having four vertical side walls in an extended position and a pair of lid members in a closed position.

The reusable container 10 in FIGS. 1 and 3 has a first lid member 26 affixed to the vertical side wall 16 and a second lid member 28 affixed to the vertical side wall 20, respectively. In FIG. 1, the lid member 26 is shown laying flat against long wall 16 while in FIG. 3 lid member 26 is shown in the closed position. As seen in FIGS. 1 and 3, the first and second lid members 26, 28 each have a plurality of segmented hinge sections 35, 37, respectively, with hinge pins molded therein. The hinge pins 39 of lid member 26 are visible in FIGS. 1 and 3 while the hinge pins of lid member 28 are not visible in either FIG. 1 or FIG. 3. The hinge pins of each of the plurality of segmented hinge sections 35, 37 of the first and second lid members 26, 28 interlock with one of a plurality of C-shaped sections 30, 32 molded into the top edges of the vertical side wall 16 and the vertical side wall 20, respectively.

FIGS. 1 and 3 additionally illustrate a plurality of top edge sections 34, 36 of the vertical side wall 16 and the vertical side wall 20 which are positioned between the plurality of C-shaped sections 30, 32, respectively. The C-shaped sections 30, 32 are molded facing outwardly such that the hinge pins cannot be disengaged while the lid members 26, 28 are in a closed position. This hinge design facilitates quick, easy assembly of lid members 26, 28 with the vertical side walls 16, 20 which reduces assembly cost, has a minimum impact on the height of the reusable container in the folded position, and transfers force applied to the lid members 26, 28 in the closed position directly to the vertical side walls 14, 20 through the plurality of top edge sections 34, 36, respectively. Further, molding the hinge pins into the plurality of segmented hinge sections 35, 37 of the less costly lid members 26, 28, respectively, reduces the repair cost when a hinge pin is damaged because the lid member 26, 28 can be easily replaced. Although the plurality of segmented hinge sections 35, 37 of the first and second lid members 26, 28 and the plurality of C-shaped sections 30, 32 of the vertical side walls 16, 20, respectively, are shown in FIGS. 1 and 3 as being molded into their respective parts, the plurality of segmented hinge sections 35, 37 and the plurality of C-shaped sections 30, 32 can be affixed by any manner known by one of ordinary skill in the art.

In another embodiment of the invention, the first 26 and second 28 lid members interlock with C-shaped sections molded into the top edge of the vertical side wall 14 and the vertical side wall 18 to better seal the reusable container 10. Additionally, an opening 54 may be provided so that the lid members 26, 28 may be sealed or locked when closed.

Figures 6, 7:
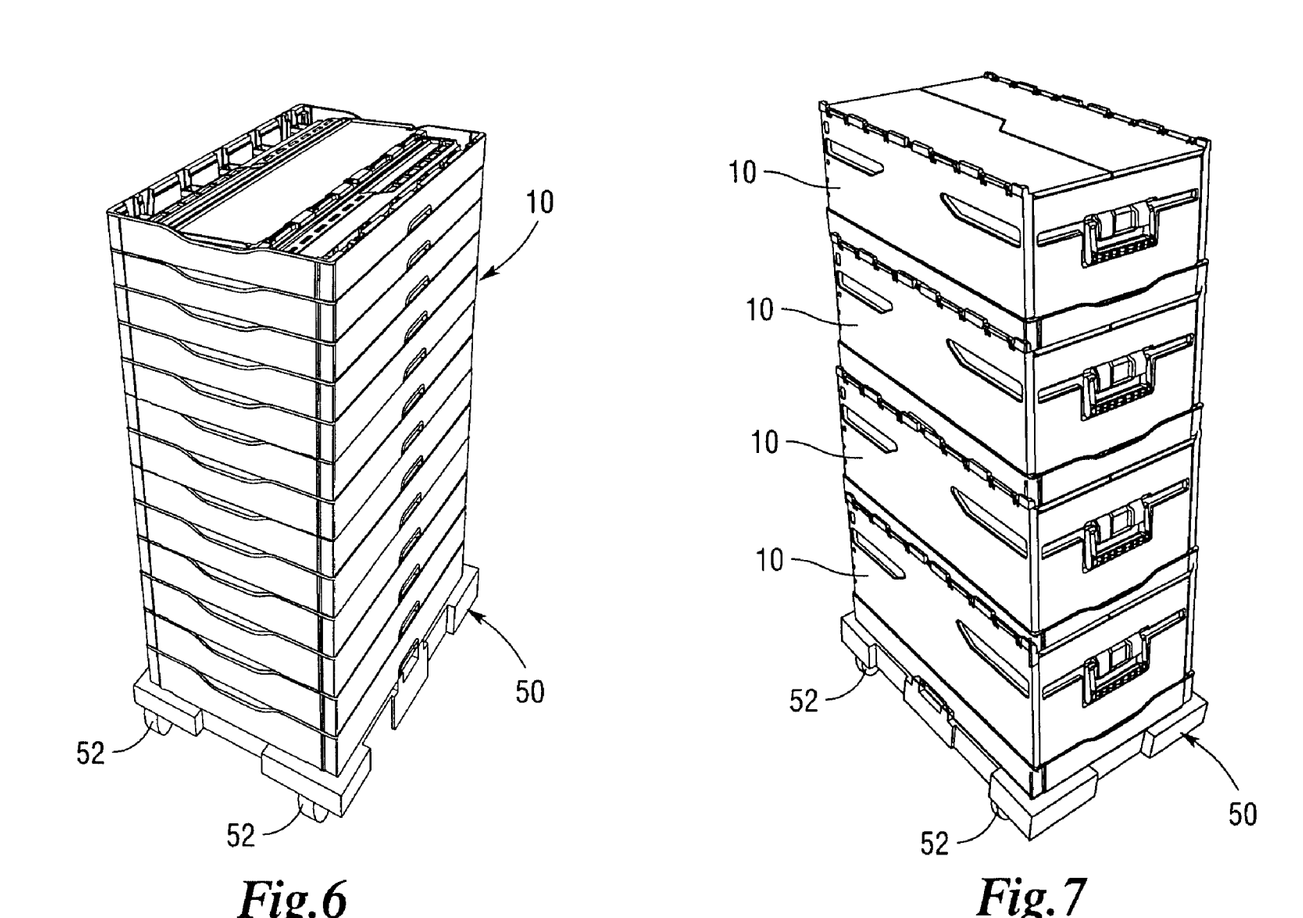
FIG. 6 depicts a plurality of reusable containers in a folded position stacked on a dolly.
FIG. 7 illustrates a plurality of reusable containers in an extended position stacked on a dolly.

Further, the reusable container 10 shown in FIG. 3 has a plurality of protrusions 29 formed on the lid members 26, 28 to allow the reusable container to interlock with the underside of the base of another reusable container when stacked. FIG. 7 depicts a stack of reusable containers 10 having the vertical side walls in the extended position and the lid members in the closed position loaded on a dolly 50 for transportation. The dolly 50 has a plurality of casters 52 affixed to the underside of the dolly 50 in any known manner. It is anticipated that the plurality of protrusions 29 on one reusable container 10 will interlock with complementary indentations in the base of an adjacent reusable container 10 such that additional restraints, e.g., straps, will not be necessary to keep the reusable containers 10 stacked and attached to the dolly 50.

Figure 5:
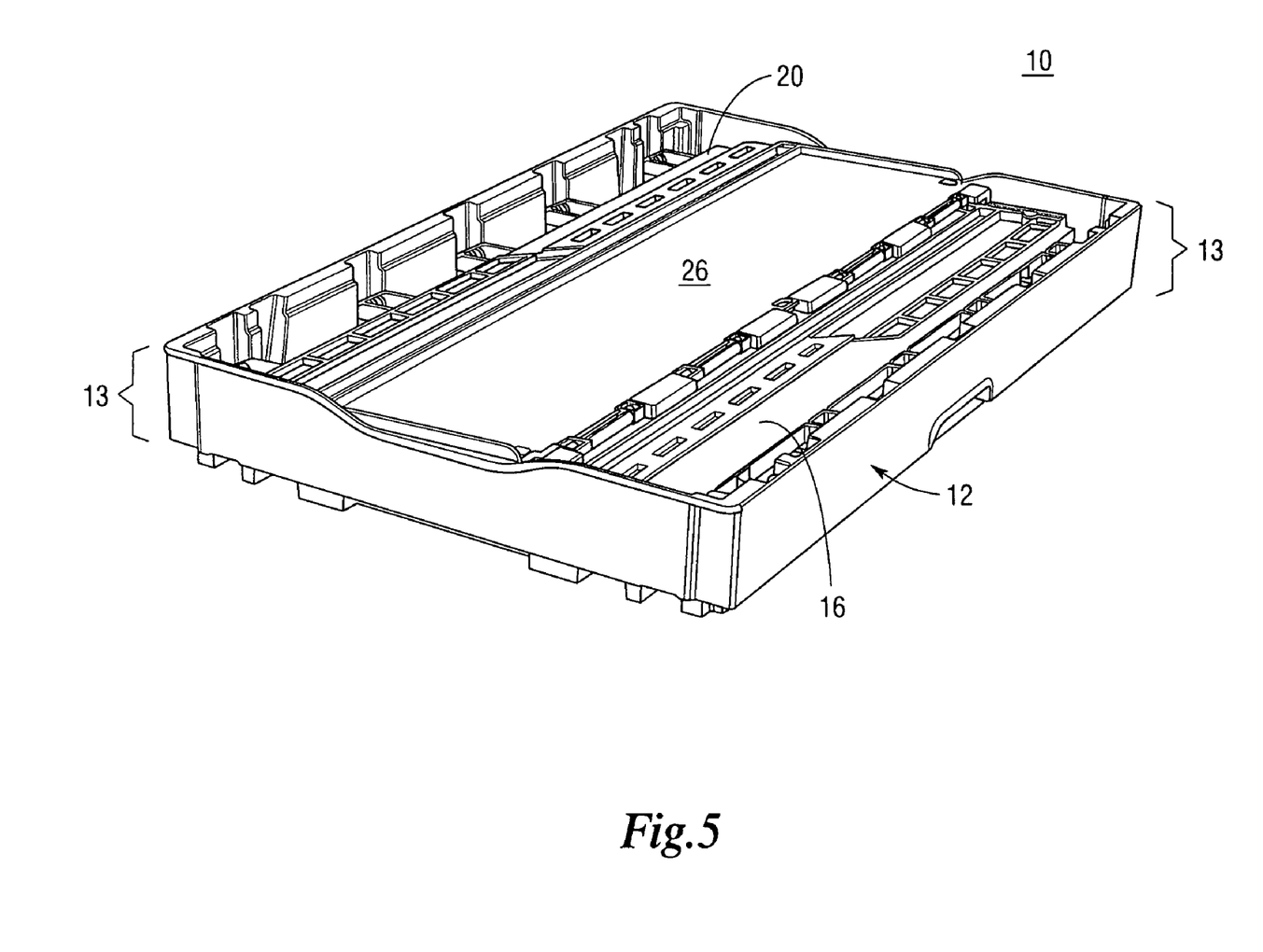
FIG. 5 illustrates the reusable container of FIG. 4 having a first pair of vertical side walls in a folded position, a second pair of vertical side walls in a folded position, and a pair of lid members in a folded position.

By transferring ribbing and other structural features to the inside of the reusable containers 10, the reusable containers 10 may be constructed so as to have smooth exterior surfaces for easy cleaning, labeling, and branding. However, ribbing and other structural members need to be carefully located so as not to increase the overall height of the crate when in the folded position as shown in FIG. 5. That can be accomplished by having ribbing and other structural members nest within mating components when the crate is in the folded position. See, for example, the opening visible in FIG. 1 in the first 22 and second 24 members which enables members 22, 24 to nest with raised molded portions (not shown) in base 12 provided for structural support.

The reusable container 10 in FIG. 1 shows a first handle 38 affixed to the vertical side wall 14. A second handle affixed to the vertical side wall 18 is not shown in FIG. 1. The first 38 and second handles provide for easy carrying of the reusable container 10 when the vertical side walls 14, 16, 18, 20 are in the extended position. The first handle 38 depicted in FIG. 1 is rotatably affixed such that a full grip is provided to the user of the reusable container 10. Although the first 38 and second handles are disclosed as being rotatably affixed and molded into the vertical side walls 14, 18, the handles can be affixed by any manner known by one of ordinary skill in the art. Additionally, any type or kind of handle known by one of ordinary skill in the art can be affixed to the reusable container. For example, in another embodiment, a first 38' and a second (not shown) handle are molded into the vertical side walls 14, 18 and operate in conjunction with openings 38" in the vertical walls 14, 18 to provide a full grip.

The reusable container 10 of FIG. 1 illustrates the vertical side walls 14, 16, 18, 20 in the extended position to form a rectangular enclosure about the rectangular base 12. The reusable container 10 of FIG. 4 illustrates the vertical side walls 14, 16, 18, 20 being folded from the extended position shown in FIG. 1 into the folded (collapsed or storage) position shown in FIG. 5.

Figure 4:
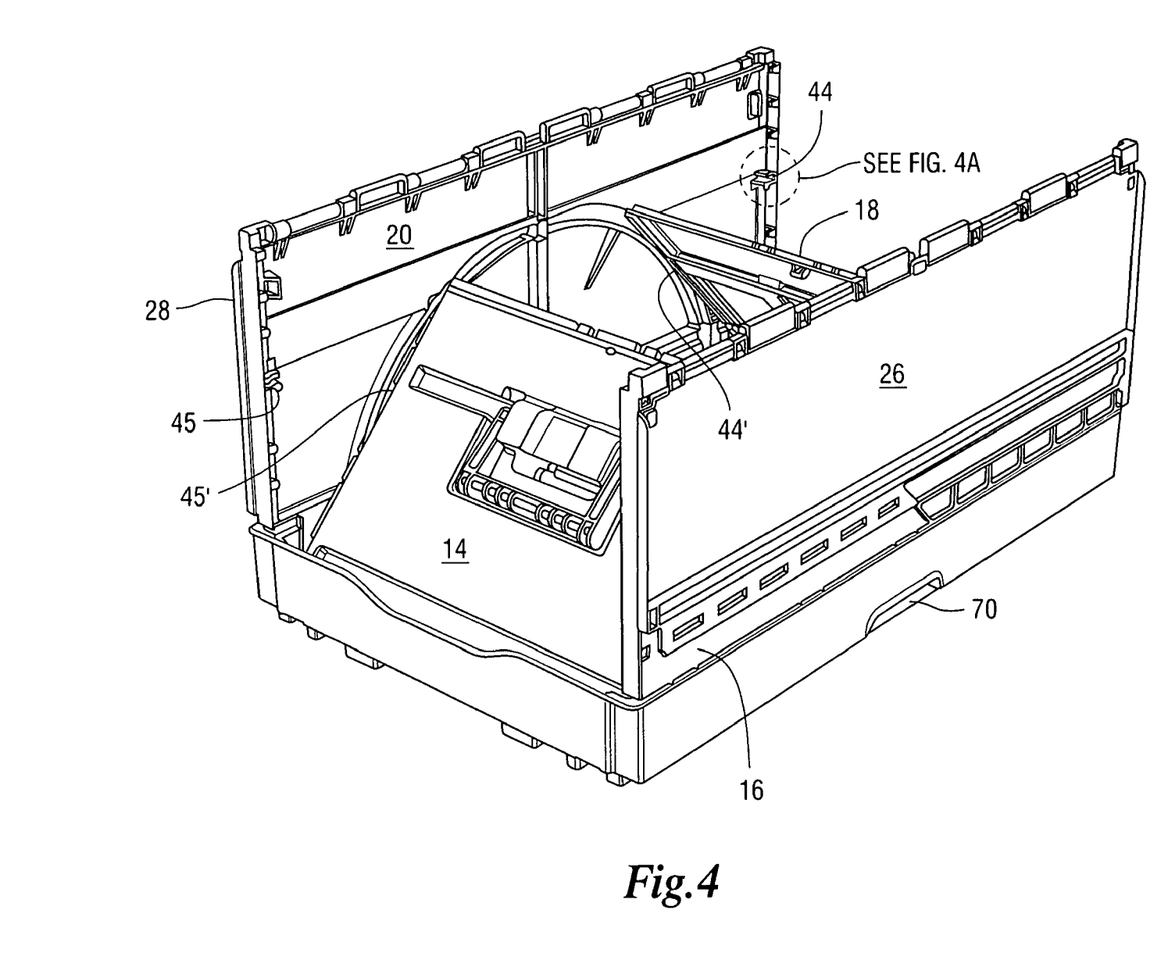

The reusable container 10 of FIG. 4 depicts the lid members 26, 28 open and lying adjacent to their respective sides 16, 20. The second movable member 24 is in the first position, and the first movable member 22 is also in the first position; however, this is not shown. The vertical side wall 14 is being moved into the folded position; the vertical side wall 18 is being folded into the folded position, while the vertical side wall 16 remains in the extended position, and the vertical side wall 20 remains in the extended position. Although the vertical side walls 14, 16, 18, 20 are shown in FIG. 4 as being rotatably affixed to the rectangular base 12, the vertical side walls 14, 16, 18, 20 can be affixed by any manner known by one of ordinary skill in the art.

Figure 4A:
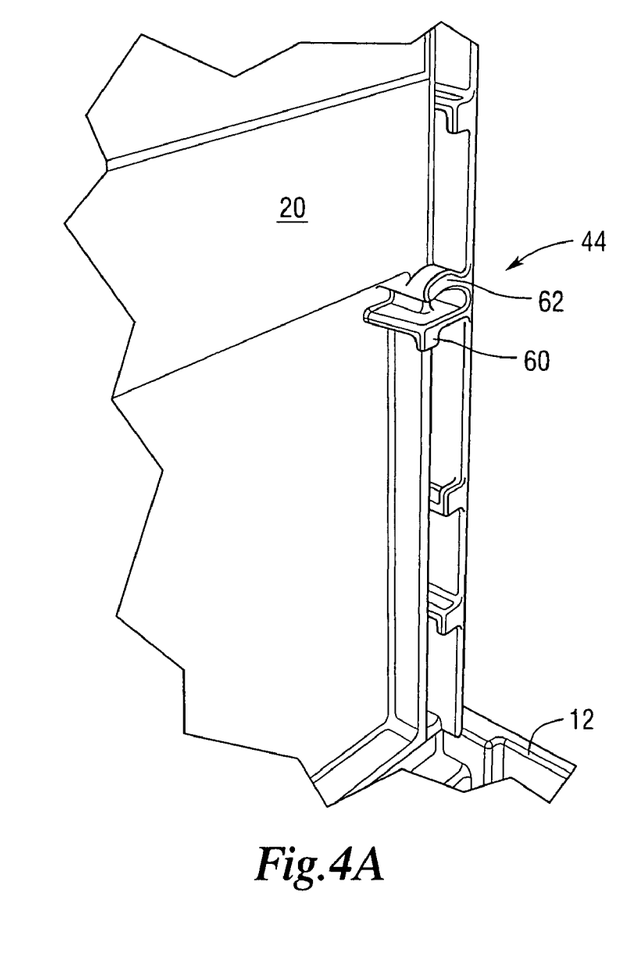
FIGS. 4A and 4B illustrate the male and female components, respectively, of the snap latch in detail.
Figure 4B:
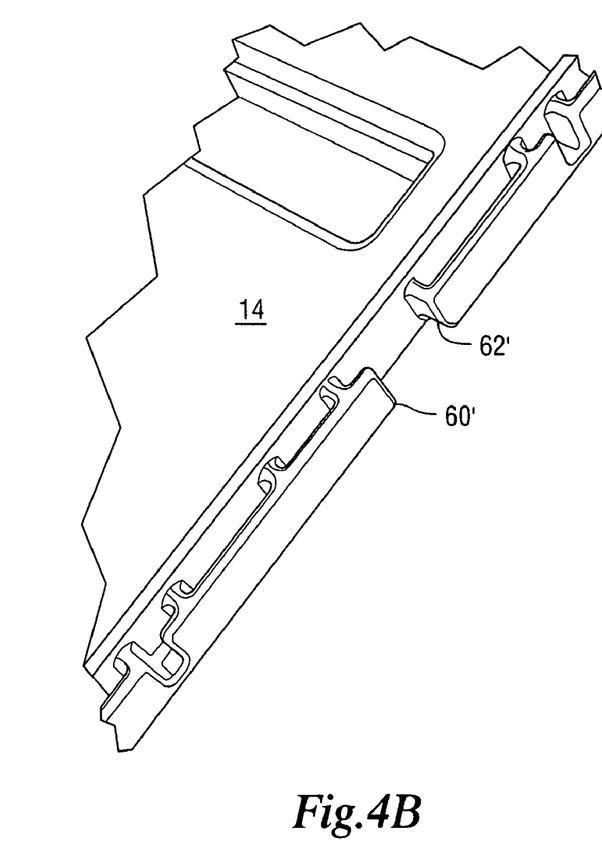

The four vertical side walls 14, 16, 18, 20 are held in the extended position by snap latches. The reader will appreciate that walls 16 and 20 each carry a male portion of two snap latches, with male portions 44 and 45 carried by wall 28 being visible in FIG. 4. Side walls 14 and 18 each carry a complementary female portion of two snap latches, with one female portion 44' carried by wall 18 and one female portion 45' carried by wall 14 visible in FIG. 4. Details of the construction of the male portion of the snap latch are shown in FIG. 4A while details of the construction of the female portion of the snap latch are shown in FIG. 4B. When transitioning from the folded position (see FIG. 5) to the extended position (See FIG. 1), the vertical side walls 16, 20 having the male portions are moved into the extended position first. The vertical side walls 14, 18 having the female portions are moved into the extended position second.

Focusing now on FIGS. 4A and 4B, the male portion of the snap latch has a bottom hook member 60 and an upper incline member 62. Upon initial engagement between the male member 44 illustrated in FIG. 4A and the female member illustrated in FIG. 4B, the bottom hook member 60 engages a bottom portion 60' of the female member. This initial engagement prevents the wall 14 from separating from the walls 16, 18. Further movement of the male member 44 into the complementary female member brings upper inclined member 62 into contact with a V-shaped member 62'. As the upper inclined member 62 passes the vertex of V-shaped member 62', the upper inclined member 62 comes to rest in a locking position behind the vertex of the V-shaped member 62'. The amount of force necessary to pull wall 14 into a vertical, locked position or to push wall 14 out of a vertical, locked position will depend upon a number of factors such as the "severity" of the V-shaped member 62', the degree of incline of the upper inclined member 62, the flexibility of the components, whether the components are self-lubricating, among others. It is anticipated, however, that only a modest amount of force will be required to pull walls 14, 18 into an upright, locked position or to push walls 14, 18 out of their upright and locked positions.

The snap latches used on the crate 10 are constructed such that the male portion protrudes almost negligibly into the volume of the crate 10. Furthermore, because there is no release button or latch, the crate 10 cannot accidentally become unlocked by files, binders, or other objects accidentally coming into contact with a latch release or latch button. Only an external force pushing inward on walls 14 and 18 will cause those walls to become unlocked. However, when the lid is closed, an interlock may be formed between the lid and the walls 14, 18 to prevent those walls from being accidentally pushed inward and becoming unlocked.

FIG. 5 illustrates the reusable container 10 in the folded position. Each of the four vertical side walls 14, 16, 18, 20 and lid members 26, 28 fit within the raised edge 13 extending along the perimeter of the base 12. The raised edge 13 of the rectangular base interlocks with the bottom of a rectangular base 13 of another reusable container in the folded position to allow stacks of reusable containers 10 in the folded position to be pushed on the dolly 50 over inclines and bumps without any restraints as shown in FIG. 6. As previously mentioned, the dolly 50 may also be used with a plurality of containers 10 in the extended position as shown in FIG. 7. Handgrips 70 may be molded into base member 12 as seen in FIG. 1 to allow crates 10 to be separated when stacked as shown in FIGS. 6 and 7.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed:

1. A reusable container comprising:
   a rectangular base;
   a first pair of vertical side walls affixed to said rectangular base, wherein each of said first pair of vertical walls has a file rail;
   a second pair of vertical side walls affixed to said rectangular base so as to form a rectangular enclosure with said first pair of vertical side walls, wherein each of said second pair of vertical side walls has a file rail; and
   a first movable member affixed to a pivot point near bottom of said reusable container so as to move between a first position within the reusable container and a second position within the reusable container in which said first movable member divides said rectangular enclosure; and
   a second movable member affixed to a pivot point near bottom of said reusable container so as to move between a first position within the reusable container and a second position within the reusable container in which said second movable member divides said rectangular enclosure;
   said first positions of the first and second movable members comprising the first and second movable members flat against the rectangular base; and
   said second positions of the first and second movable members comprising the first and second movable members in a direction perpendicular to the rectangular base;
   wherein the first positions of the first and second movable members accommodate hanging legal-sized files above the first and second movable members, and wherein the second positions of the first and second movable members accommodate hanging letter-sized files between the first or second movable members and a file rail of the vertical side walls; and
   wherein said second positions of the first and second movable members comprise the first and second movable members flat against each other in a direction perpendicular to the rectangular base.

2. The reusable container of claim 1, wherein said first movable member, when in said first position, enables said enclosure to accommodate one row of legal-sized files, and when in said second position, enables said enclosure to accommodate two rows of letter-sized files.

3. The reusable container of claim 1, wherein said first movable member carries a pair of oppositely positioned file rails.

4. The reusable container of claim 1, wherein each of said first and said second movable members carries a file rail.

5. The reusable container of claim 1, wherein said file rails of said first pair of vertical side walls and said file rails of said second pair of vertical side walls comprise molded portions of said first pair of vertical side walls and said second pair of vertical side walls, respectively.

6. The reusable container of claim 1, wherein said first pair of vertical side walls and said second pair of vertical side walls are rotatably affixed to said rectangular base.

7. The reusable container of claim 6, wherein said first pair of vertical side walls and said second pair of vertical side walls additionally comprise snap latches to hold said first pair of vertical side walls and said second pair of vertical side walls in an extended position.

8. The reusable container of claim 7, wherein said snap latches comprise a V-shaped female portion carried by one of said pairs of vertical side walls and adapted to receive an inclined male portion carried by the other of said pairs of vertical side walls.

9. The reusable container of claim 6, wherein said first and second movable members, said first pair of vertical side walls, and said second pair of vertical side walls are rotatable between a folded position and an extended position which forms said rectangular enclosure.

10. The reusable container of claim 9, wherein said first and second movable members, said first pair of vertical side walls, and said second pair of vertical side walls fit within a perimeter of said rectangular base when in said folded position.

11. The reusable container of claim 1, further comprising a pair of lid members, wherein said pair of lid members are affixed directly to opposing vertical side walls.

12. The reusable container of claim 11, wherein said pair of lid members has a plurality of first segmented hinge sections for interlocking with a plurality of segmented hinge sections carried by opposing vertical side walls.

13. The reusable container of claim 12, wherein said plurality of segmented hinge sections of said lid members comprises a plurality of hinge pins, and wherein said plurality of segmented hinge sections carried by opposing vertical walls comprises a plurality of C-shaped sections.

14. The reusable container of claim 11, wherein said first and second movable members, said first pair of vertical side walls, said second pair of vertical side walls, and said pair of lid members move between a folded position and an extended position which forms said rectangular enclosure, and when in said folded position, said first and second movable members, said first pair of vertical side walls, said second pair of vertical side walls, and said pair of lid members fold within a perimeter of said rectangular base.

15. The reusable container of claim 11, wherein said pair of lid members has a plurality of extrusions for interlocking with another reusable container.

16. The reusable container of claim 14, wherein said rectangular base of said reusable container when in a folded position has a top configured to interlock with a bottom of a rectangular base of another reusable container in a folded position.

17. A collapsible reusable container having vertical walls, the improvement comprising:
   a first movable member affixed to a pivot point near bottom of said reusable container so as to move between a first position within the reusable container and a second position within the reusable container in which said first movable member divides said reusable container into a pair of compartments for receiving hanging files; and
   a second movable member affixed to a pivot point near bottom of said reusable container so as to move between a first position within the reusable container and a second position within the reusable container in which said second movable member divides said reusable container into a pair of compartments for receiving hanging files;
   said first positions of the first and second movable members comprising the first and second movable members parallel to the bottom of the reusable container;
   said second positions of the first and second movable members comprising the first and second movable members perpendicular to the bottom of the reusable container;
   said pivot point of the first movable member permitting rotation of the first movable member only in a first direction from first to second position and a second direction from second to first position; and
   said pivot point of the second movable member permitting rotation of the second movable member only in the second direction from first to second position and the first direction from the second to first position;
   wherein the first and second movable members accommodate hanging legal-sized files above the first and second movable members when in the first position and accommodate hanging letter-sized files between the first movable member or second moveable member and a file rail of the vertical side walls when in the second position; and
   wherein said second positions of the first and second movable members comprise the first and second movable members flat against each other in a direction perpendicular to the rectangular base.

18. The reusable container of claim 17, wherein said first movable member in said second position supports two rows of files.

19. A combination comprising:
   a plurality of reusable containers, each comprising:
      a rectangular base having a raised edge along the perimeter thereof, said base having a top configured to interlock with a bottom of a rectangular base of an adjacent reusable container;
      a first pair of vertical side walls affixed to said rectangular base, wherein each of said first pair of vertical side walls has a file rail and is configured to fold within said raised edge of said rectangular base;
      a second pair of vertical side walls affixed to said rectangular base so as to form a rectangular enclosure with said first pair of vertical side walls, wherein each of said second pair of vertical side walls has a file rail and is configured to fold within said raised edge of said rectangular base;
      a first movable member affixed to a pivot point near bottom of said reusable container so as to move between a first position within the reusable container and a second position within the reusable container in which said first movable member divides said rectangular enclosure, wherein said first movable member is configured to fold within said raised edge of said rectangular base;
      a second movable member affixed to a pivot point near bottom of said reusable container so as to move between a first position within the reusable container and a second position within the reusable container in which said second movable member divides said rectangular enclosure, wherein said second movable member is configured to fold within said raised edge of said rectangular base;
      wherein the first positions of the first and second movable members accommodate hanging legal-sized files above the first and second movable members, and the second positions of the first and second movable members accommodate hanging letter-sized files between the first movable member or the second moveable member and a file rail of the vertical side walls; and
      wherein said second positions of the first and second movable members comprise the first and second movable members flat against each other in a direction perpendicular to the rectangular base.

20. The reusable container of claim 1, wherein when the first movable member is in the first position, and the second movable member is in the first position, the reusable container accommodates hanging legal-sized files above both the first movable member and the second movable member.

21. The reusable container of claim 1, wherein when the first movable member is in the second position, and the second movable member is in the first position, the reusable container accommodates hanging legal-sized files above the second movable member, and the reusable container accommodates hanging letter-sized files between the first movable member and a file rail on one of the vertical side walls.

22. The reusable container of claim 1, wherein when the first movable member is in the second position and the second movable member is in the second position, the reusable container accommodates hanging letter-sized files between the first movable member and a first file rail on a first one of the vertical side walls, and the reusable container accommodates hanging letter-sized files between the second movable member and a second file rail on a second one of the vertical side walls.

23. The reusable container of claim 1, wherein the first movable member is shorter than the first pair of vertical side walls to accommodate hanging the letter-sized files between the first movable member and the file rail on one of the vertical side walls with a lid closed on top of the reusable container.

24. The reusable container of claim 1, wherein:
   said pivot point of the first movable member permits rotation of the first movable member only in a clockwise direction from first to second position and a counter-clockwise direction from second to first position; and
   said pivot point of the second movable member permits rotation of the second movable member only in a counter-clockwise direction from first to second position and a clockwise direction from the second to first position.

25. The combination of claim 19, further comprising a dolly, said dolly comprising:

an upwardly facing rectangular surface configured for receiving a bottom of a rectangular base of a reusable container; and a plurality of casters affixed to a side opposite to said upwardly facing rectangular surface.

26. A reusable container comprising:

a rectangular base;

a first pair of vertical side walls affixed to said rectangular base, wherein each of said first pair of vertical walls has a file rail;

a second pair of vertical side walls affixed to said rectangular base so as to form a rectangular enclosure with said first pair of vertical side walls, wherein each of said second pair of vertical side walls has a file rail;

means for dividing said reusable container, said means for dividing comprising first and second positions, said first position comprising one or more movable members flat against the rectangular base, and said second position comprising one or more movable members in a direction perpendicular to the rectangular base; and means for hanging letter-sized and legal-sized folders within the reusable container;

wherein if said second position comprises at least two movable members in a direction perpendicular to the rectangular base, said second position comprises the at least two movable members flat against each other in the direction perpendicular to the rectangular base.

27. The reusable container of claim 26, wherein said one or more movable members comprise:

a first movable member with a pivot point that permits rotation of the first movable member only in a clockwise direction from first to second position and a counter-clockwise direction from second to first position; and a second movable member with a pivot point that permits rotation of the second movable member only in a counter-clockwise direction from first to second position and a clockwise direction from the second to first position.

28. The reusable container of claim 27, wherein said first movable member, when in said first position, enables said reusable container to accommodate one row of legal-sized files, and when in said second position, enables said enclosure to accommodate one or two rows of letter-sized files.

29. The reusable container of claim 28, wherein said first and second movable members, said first pair of vertical side walls, and said second pair of vertical side walls, move between a folded position and an extended position which forms a rectangular enclosure, and when in said folded position, said first and second movable members, said first pair of vertical side walls, and said second pair of vertical side walls fold within a perimeter of said rectangular base.

30. The reusable container of claim 29, wherein said rectangular base of said reusable container when in a folded position has a top configured to interlock with a bottom of a rectangular base of another reusable container in a folded position.

* * * * *